United States Patent [19]

Lampe et al.

[11] 4,142,007
[45] Feb. 27, 1979

[54] EMBOSSED LAMINATED BOARD

[75] Inventors: John G. Lampe, High Point; Paul W. Whitley, Lexington, both of N.C.

[73] Assignee: Armstrong Cork Company, Lancaster, Pa.

[21] Appl. No.: 874,796

[22] Filed: Feb. 3, 1978

Related U.S. Application Data

[63] Continuation of Ser. No. 741,779, Nov. 15, 1976, abandoned.

[51] Int. Cl.² .................... B32B 3/30; B32B 31/20
[52] U.S. Cl. ............................ 428/165; 101/32; 156/220; 156/222; 264/112; 264/113; 264/119; 428/171; 428/172; 428/217
[58] Field of Search ............. 428/165, 171, 172, 217; 156/219, 220, 221, 61, 222; 264/112, 113, 119, 134, 135, 136, 137, 284, 319, 320; 101/32; 144/328

[56] References Cited

U.S. PATENT DOCUMENTS

| | | | |
|---|---|---|---|
| 2,666,726 | 1/1954 | King et al. | 428/162 |
| 3,846,219 | 11/1974 | Kunz | 428/165 |
| 3,880,687 | 4/1975 | Elmendorf et al. | 428/217 |

Primary Examiner—Stanley S. Silverman

[57] ABSTRACT

A method is provided for forming a unique embossed laminated board product. A hard core is covered with a soft wood veneer and this is then covered with a resin treated wood fiber sheet. The composite structure is embossed, the embossing occurring in the resin fiber sheet and soft wood veneer. The hard core provides structural rigidity to the finished product and good definition to the embossed product.

7 Claims, 1 Drawing Figure

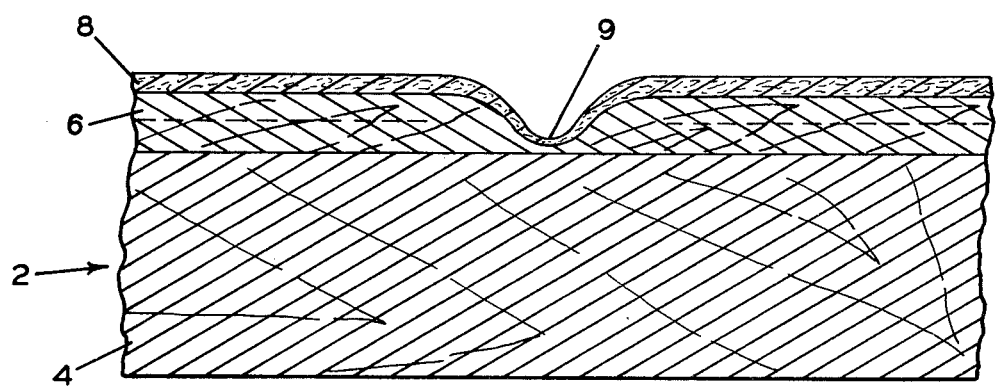

EMBOSSED LAMINATED BOARD

CROSS-REFERENCE TO RELATED APPLICATION

This is a continuation of application Ser. No. 741,779, filed Nov. 15, 1976, now abandoned.

BACKGROUND OF THE INVENTION

1. Field of the Invention

The invention is directed to a method of forming an embossed article and, more particularly, to a plural layer embossed wood product.

2. Description of the Prior Art

U.S. Pat. No. 2,666,726 is directed to the application of a resin-containing paper to the face of plywood or a composite fiberboard. The resultant product is embossed. The resin-containing paper is applied directly to a hard composite sheet or placed over plural layers of soft wood. Embossing is to the depth of about or slightly greater than the thickness of the resin-containing paper.

An object of the invention herein is to provide deep embossing of a resin-containing paper when used over a composite or hard core structure. Such is accomplished through the use of a soft wood veneer between the resin-containing paper and the hard core.

SUMMARY OF THE INVENTION

The invention is directed to a method of manufacturing an improved embossed board, and the board which is produced by the method. The method requires the covering of a core stock having a ball hardness of 800 or more (ASTM Test D143-83 through 86) with a wood veneer having a ball hardness several hundred units less than the core stock. This veneer is then covered with a resin-containing wood fiber sheet. The composite structure is embossed through the use of heat and pressure to deeply emboss said structure over twice the thickness of said wood fiber sheet.

BRIEF DESCRIPTION OF THE DRAWING

The FIGURE is a cross-sectional view of the inventive product formed by the inventive method herein.

DESCRIPTION OF THE PREFERRED EMBODIMENT

The inventive board structure 2 which is formed by the inventive method herein is shown in the drawing. The core stock 4 is covered by one or more layers of soft wood veneer 6 and this in turn is then covered by a resin-containing wood fiber sheet 8. The resultant product can be deeply embossed as shown at point 9.

The core stock 4 is normally (a) pecan wood which has an average ball harness of 1,820, (b) 50-pound homogenous particle board which has an average ball hardness of 3,020, or (c) three-layer particle board which has an average ball hardness of 1,340. It is obvious that other woods could be utilized for the core stock. It has been found that a ball hardness of 800 or more is most suitable for embossing. Very soft cores do no provide structural rigidity to the finished product and they tend to collapse during embossing and do not accept sharp detail in the embossed surface. Therefore, the hardness of the core affects both embossing and the strength of the finished product. However, a hard core, while providing a firm base for embossing, does not itself accept embossing well. Therefore, the hard core covered only by a very thin resin-containing fiber sheet will be embossed only to the approximate thickness of the sheet.

Consequently, the hard core is covered with one or more layers of soft wood veneering of approximately 1/16 inch of thickness for each layer used. A particularly good material to use for the layer 6 is yellow poplar, which has an average ball hardness of 540. Other soft wood materials with a ball hardness of less than about 800 could be utilized. It should be realized that this ball hardness of 800 is a relative term. The important point to keep in mind is the fact that the relatively hard core must be covered with a relatively soft veneer having a ball hardness several hundred units less than the core hardness. It is obvious that a core with a 3,000 ball hardness could be covered with a softer material having a 1,500 ball hardness, and if sufficient pressure is utilized, a satisfactory embossing can be carried out. However, it has been found that you can go as low as an 800 ball hardness and still have a satisfactory core. Obviously, then, this core must be covered by a veneer which has a ball hardness less than 800. Much less pressure would be utilized on the veneer with a 540 ball hardness as compared to the veneer with a 1,500 ball hardness.

The core 4 and wood veneer 6 are then covered with a resin-containing wood fiber sheet 8. It is obvious that different sheets could be utilized, for example, that of U.S. Pat. No. 2,666,726. It should be a wood fiber resin-containing sheet which will have the resin cure upon the application of heat and pressure.

The laminate structure is assembled together through the use of conventional urea formaldehyde glues. It is then subjected to an embossing operation wherein heat and pressure through an embossing die provide the sheet with the desired embossing, which embossing should be of a depth at least twice the thickness of the wood fiber sheet 8. Normally, the wood fiber sheet is approximately 1/32 inch in thickness. Embossing to ⅛ inch has been easily secured.

The preferred structure and its method of manufacture is described below. As the core stock, one utilizes a 50-pound per cubic foot homogenous particle board having an average ball hardness of 3,020. This board is a wood particle structure bound together by urea formaldehyde. Over the board is placed a 1/16 inch thick veneer of poplar which has an average ball hardness of 540. Overtop of this is placed a urea formaldehyde wood fiber sheet. A particularly good sheet to utilize is the "Luxcell" material of International Paper Company. This is a urea formaldehyde sheet having a modulus of rupture of 16,000 and a modulus of elasticity of $1.39 \times 10^6$. In its uncured state, it has a density of 45 pounds per cubic foot, and after being cured and pressed it has a density of 64 pounds per cubic foot. The five-layer structure is assembled together and laminated together through the use of a hot or cold press at about 150 pounds per square inch using conventional urea formaldehyde glues. If both sides of the core stock are covered with the veneer and fiber sheet, then a five-layer structure is laminated together. This structure is then passed to the embossing press which operates at a temperature of 465° F. to 485° F. and under a pressure ranging from 800 to 2,500 pounds per square inch. Obviously, the complexity and depth of the embossing control the pressure being utilized. The product is then provided with sharp, deep embossing, which embossing should be to at least twice the thickness of the "Luxcell" sheet, which is approximately 1/32 inch in thickness. If the product so formed is to be used as a furniture part, then it would be design printed, stained and finished in the convenient manner now used to make printed surface furniture components.

What is claimed is:

1. An improved laminated board structure which comprises:
   (a) a bonded particle core stock having a ball hardness of 800 or more,
   (b) a natural wood veneer covering over the core stock, said veneer covering having a ball hardness less than the core stock and being several hundred units less than the ball hardness of the core stock,
   (c) a bonded wood fiber surface sheet covering said wood veneer, and
   (d) said laminated structure having surface embossing which is over twice the thickness of said wood fiber surface sheet.

2. An improved laminated board structure as set forth in claim 1 wherein said core stock is a 50-pound homogenous particle board and said veneer covering is poplar.

3. An improved laminated board structure as set forth in claim 2 wherein said veneer covering is two or more layers of separate veneering.

4. The method of manufacturing an improved embossed board, which method comrprises:
   (a) covering a bonded particle core stock having a ball hardness of 800 or more with a natural wood veneer having a ball hardness of several hundred units less than the hardness of the core stock,
   (b) covering said veneer with a bonded wood fiber sheet,
   (c) laminating said core stock, veneer, and wood fiber sheet together, and
   (d) embossing with heat and pressure said above laminated three-layer structure to deeply emboss said structure over twice the thickness of said wood fiber sheet.

5. The method of claim 4 wherein said core stock has a ball hardness of about 3,000 and said veneer is a soft wood fiber having a ball hardness of about 500 to 2,100.

6. The method of claim 5 wherein said embossing pressure is in the range of 800 to 2,500 psi and said temperature range for embossing is from 370° to 500°.

7. The method of claim 6 wherein the fiber sheet is about 1/32 inches in thickness and the embossing is at least twice the thickness of the fiber sheet.

* * * * *